(12) United States Patent
Yang

(10) Patent No.: US 11,250,481 B2
(45) Date of Patent: Feb. 15, 2022

(54) BLOCKCHAIN-BASED RESOURCE VALUE EVALUATION METHODS AND APPARATUS

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/780,221

(22) Filed: Feb. 3, 2020

(65) Prior Publication Data

US 2020/0167836 A1    May 28, 2020

Related U.S. Application Data

(62) Division of application No. 16/415,337, filed on May 17, 2019.

(30) Foreign Application Priority Data

May 17, 2018    (CN) .......................... 201810476443.6

(51) Int. Cl.
*G06Q 30/02*    (2012.01)
*G06N 20/00*    (2019.01)
(Continued)

(52) U.S. Cl.
CPC ....... *G06Q 30/0278* (2013.01); *G06K 9/6257* (2013.01); *G06N 5/003* (2013.01);
(Continued)

(58) Field of Classification Search
CPC ..... G06Q 20/00–425; G06Q 30/00–08; G06N 5/00–048; G06N 20/00–20; H04L 9/00–38
See application file for complete search history.

(56) References Cited

U.S. PATENT DOCUMENTS 8,140,421 B1 *   3/2012   Humphries .......... G06Q 40/025
                                                           705/36 R
2012/0166249 A1   6/2012   Jackson
                          (Continued)

FOREIGN PATENT DOCUMENTS

CN          105913320          8/2016
CN          107085807          8/2017
                  (Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Mohammad A. Nilforoush
(74) *Attorney, Agent, or Firm* — Fish & Richardson P.C.

(57) ABSTRACT

A method for dynamically evaluating a resource value is described. Data encoding one or more parameters related to the resource value is accessed, where the one or more parameters are monitored by a plurality of sensors that form an Internet of Things (IoT) and then released by the IoT of the plurality of sensors on a blockchain network. At least one parameter from the data is compared with a predetermined threshold value or a predetermined threshold range. In response to determining that the at least one parameter has exceeded the predetermined threshold value or the predetermined threshold range, a calculation of the resource value is triggered according to evaluation logic described by a smart contract released on the blockchain network in association with the one or more parameters being monitored, such that a consensus is reached on the blockchain network regarding the resource value that has been calculated.

12 Claims, 6 Drawing Sheets

(51) Int. Cl.
*G06Q 20/40* (2012.01)
*G06Q 40/02* (2012.01)
*G06N 5/00* (2006.01)
*G06K 9/62* (2022.01)
*H04L 9/06* (2006.01)

(52) U.S. Cl.
CPC .......... *G06N 20/00* (2019.01); *G06Q 20/405* (2013.01); *G06Q 40/02* (2013.01); *H04L 9/0637* (2013.01)

(56) References Cited

U.S. PATENT DOCUMENTS

| | | |
|---|---|---|
| 2016/0314545 A1 | 10/2016 | Jessen |
| 2016/0378585 A1 | 12/2016 | McElhinney et al. |
| 2017/0232300 A1 | 8/2017 | Tran et al. |
| 2017/0287090 A1 | 10/2017 | Hunn et al. |
| 2017/0302663 A1 | 10/2017 | Nainar et al. |
| 2018/0089585 A1* | 3/2018 | Rickard, Jr. ..... G06Q 10/06375 |
| 2018/0094953 A1 | 4/2018 | Colson et al. |
| 2018/0218176 A1 | 8/2018 | Voorhee et al. |
| 2019/0244287 A1* | 8/2019 | Prasad Datta ....... G06Q 40/025 |
| 2019/0355025 A1 | 11/2019 | Yang |

FOREIGN PATENT DOCUMENTS

| | | |
|---|---|---|
| CN | 107578337 | 1/2018 |
| CN | 107749848 | 3/2018 |
| CN | 107909416 | 4/2018 |
| JP | 2005149327 A | 6/2005 |
| JP | 2018022313 A | 2/2018 |
| JP | 2018045300 A | 3/2018 |
| KR | 101679301 B1 | 11/2016 |
| WO | 2015145979 A1 | 10/2015 |
| WO | 2017090329 A1 | 6/2017 |

OTHER PUBLICATIONS

How Computers Work, 7th ed., Que Publishing, Oct. 2003, Chapter 1, 44 pages.

International Search Report and Written Opinion in International Application No. PCT/US2019/032677, dated Jul. 24, 2019, 6 pages.

Nakamoto, "Bitcoin: A Peer-to-Peer Electronic Cash System," www.bitcoin.org, 2005, 9 pages.

ibm.com [online], "Cheat sheet: What has blockchain to do with the IoT?", available on or before Feb. 2, 2018, via internet Archive: Wayback Machine URL <https://web.archive.org/web/20180202151243/https://www.ibm.com/blogs/internet-of-things/iot-and-blockchain-cheat-sheet/>, retrieved on Sep. 6, 2021, URL <https://www.ibm.com/blogs/internet-of-things/iot-and-blockchain-cheat-sheet/>, 5 pages.

gomguard.tistory.com [online], "[Machine Learning] Decision Making Trees", Dec. 4, 2017, retrieve from URL <https://gomguard.tistory.com/86>, 12 pages (machine translation included).

Krzywinski et al., "Classification and regression trees," Nat. Methods 14, Jul. 2017, 757-758.

Lundkvist, "Decision Tree Classification and Forecasting of Pricing Time Series Data," Master's Degree Project, KTH, School of Electrical Engineering (EES), Jul. 2014, 79 pages.

* cited by examiner

BLOCKCHAIN-BASED RESOURCE VALUE EVALUATION METHODS AND APPARATUS

CROSS-REFERENCE TO RELATED APPLICATIONS

This application is a division of U.S. patent application Ser. No. 16/415,337, filed on May 17, 2019, which claims priority to Chinese Patent Application No. 201810476443.6, filed on May 17, 2018, and each application is hereby incorporated by reference in its entirety.

TECHNICAL FIELD

The present specification relates to the field of network communications technologies, and in particular, to a blockchain-based resource value evaluation methods and apparatus.

BACKGROUND

Movable property financing is a credit service of mortgaging/pledging movable property or goods rights self-owned by an enterprise or legally owned by a third party, or supervising movable property or goods rights of an enterprise by a bank. Physical factors (for example, environment temperature and humidity, and prolongation of time related to product performance) related to value of the movable property can change when the movable property is mortgaged/pledged or supervised, and the value of the movable property can also change accordingly. There is no value evaluation method for the movable property or the goods rights being mortgaged/pledged or supervised, to correspondingly adjust a financing policy based on a value change.

SUMMARY

To resolve the previous problem, the present specification provides a blockchain-based resource value evaluation method, where a blockchain network includes a plurality of device nodes provided with sensors, the sensors are configured to perceive or collect parameters related to a resource value, and where the method includes the following: obtaining information data released on the blockchain network, where the information data is released on the blockchain network by the plurality of device nodes provided with the sensors, and where the information data includes the parameter related to the resource value; determining whether a parameter value in the information data exceeds a predetermined threshold or a threshold range; and in response to determining that the parameter value in the information data exceeds the predetermined threshold or the threshold range, calculating the resource value using a predetermined resource value evaluation logic.

Preferably, the method provided in the present specification further includes the following: performing a processing service in response to a resource value change based on the calculated resource value.

Preferably, the determining whether a parameter value in the information data exceeds a predetermined threshold or a threshold range, and in response to determining that the parameter value in the information data exceeds the predetermined threshold or the threshold range, calculating the resource value using a predetermined resource value evaluation logic includes the following: invoking a resource value evaluation smart contract released on the blockchain network; executing an execution program that is declared in the smart contract and that is used for determining whether the parameter value in the information data exceeds the predetermined threshold or the threshold range; and in response to determining that the parameter value in the information data exceeds the predetermined threshold or the threshold range, calculating the resource value using the resource value evaluation logic, to obtain the resource value.

Preferably, the performing a processing service in response to a resource value change includes the following: invoking a processing smart contract in response to the resource value change that is released on the blockchain network; and executing a processing program in response to the resource value change that is declared in the smart contract.

Preferably, the device nodes provided with sensors include Internet of Things sensor nodes, and where the information data is sent by a plurality of Internet of Things (IoT) sensor nodes to the blockchain network through the Internet of Things.

Preferably, the resource value evaluation logic includes a resource value evaluation model obtained by performing machine learning training on the resource value based on the parameter related to the resource value.

Preferably, a machine learning training method for performing the machine learning training on the resource value includes a decision tree method.

Preferably, the performing a processing service in response to a resource value change includes: reevaluating a financing amount generated based on a resource.

Preferably, the performing a processing service in response to a resource value change includes: performing risk control processing on a financing loan started based on a resource, where the risk control processing includes tightening or relaxing an unissued loan.

Preferably, the blockchain network is a consortium blockchain network.

Preferably, that the sensors are configured to perceive or collect parameters related to the resource value includes the following: each of the sensors is configured to perceive or collect a parameter of each constituent entity of a resource that is related to the value of the constituent entity; and where the calculated resource value is greater than or equal to the sum of the values of all constituent entities of the resource.

Preferably, that the sensors are configured to perceive or collect parameters related to the resource value includes the following: the sensors are configured to perceive or collect parameters of a plurality of constituent entities of a resource that are related to the resource value of the plurality of constituent entities.

Correspondingly, the present invention further provides a blockchain-based resource value evaluation apparatus, where a blockchain network includes a plurality of device nodes provided with sensors, where the sensors are configured to perceive or collect parameters related to a resource value, and where the apparatus includes the following: an acquisition unit, configured to obtain information data released on the blockchain network, where the information data is released on the blockchain network by the plurality of device nodes provided with the sensors, and where the information data includes the parameter related to the resource value; a determining unit, configured to determine whether a parameter value in the information data exceeds a predetermined threshold or a threshold range; and a calculation unit, configured to calculate the resource value using a predetermined resource value evaluation logic.

Preferably, the apparatus further includes the following: a service processing unit, configured to perform a processing service in response to a resource value change based on the calculated resource value.

The present specification further provides a computer device, including a memory and a processor, where the memory stores a computer program that can run on the processor, and where when running the computer program, the processor performs the steps of the described resource value evaluation method.

The present specification further provides a computer readable storage medium, where the computer readable storage medium stores a computer program, and where when the computer program is run by a processor, the steps of the described resource value evaluation method are performed.

It can be seen from the previous technical solutions that according to the blockchain-based resource value evaluation method and apparatus, the information data collected by a sensing device is used to evaluate the resource value through dynamic association, and the sensing device sends the data collected through sensing to the blockchain network. A tamper-resistance mechanism of the blockchain network ensures the authenticity and the validity of the data, thereby providing reliable data guarantee for dynamic resource value evaluation. In addition, in the present specification, data collected by an IoT sensing device can be used to dynamically trigger and invoke the resource value evaluation smart contract deployed on the blockchain network, to autonomously complete value evaluation for movable property, so that the evaluation is characterized by less human intervention and authority decentralization, thereby improving evaluation fairness.

DESCRIPTION OF IMPLEMENTATIONS

Different from the value of immovable property such as houses that usually fluctuates only with the market, the value of movable property is usually affected by an environmental factor, such as temperature, humidity, or time. For example, in a goods mortgage loan service, longer mortgage time of food leads to a larger value loss due to an expiration date, and the value of electronic products is greatly damaged due to sudden temperature and humidity changes because the electronic products are very sensitive to temperature and humidity of a storage environment. Currently, for financing loan based on movable property in the market, fixed or static value credit is given to the movable property based on a market pricing policy at an initial stage of a financing service. In an entire movable property financing process, a financing policy cannot be adjusted in time based on a value change of the movable property. For example, when the value of the movable property has greatly declined compared with that the movable property has when the credit is given to the movable property during loan issuing, it is very risky for a loan company such as a bank to issue a loan based on an original loan application amount of a customer.

The present specification is intended to provide a resource value evaluation method and apparatus, to dynamically evaluate the value of movable goods in time, and help a corresponding institution perform corresponding processing in response to a value change. The resource value evaluation method and apparatus provided in the present specification are established based on a blockchain network. A device provided with a sensor perceives a parameter related to the value of the movable property, and the parameter data perceived by the device provided with the sensor is transmitted to the blockchain network, so that the value of the movable property can be effectively evaluated and determined in time by using the sensing device and the blockchain network. The resource value evaluation method provided in the present specification can be performed by a service terminal device of the loan company such as a bank, a terminal device of a financial loan regulator, or a terminal device of another institution that needs to perform resource value evaluation or perform service processing in response to a resource value change in value evaluation.

The implementations provided in the present specification can run on any device having computing and storage capabilities, such as a mobile phone, a tablet computer, a personal computer (PC), a notebook computer, or a server; or each function in the implementations of the present specification can be implemented by using a logical node running on one or more devices.

Figure 1:
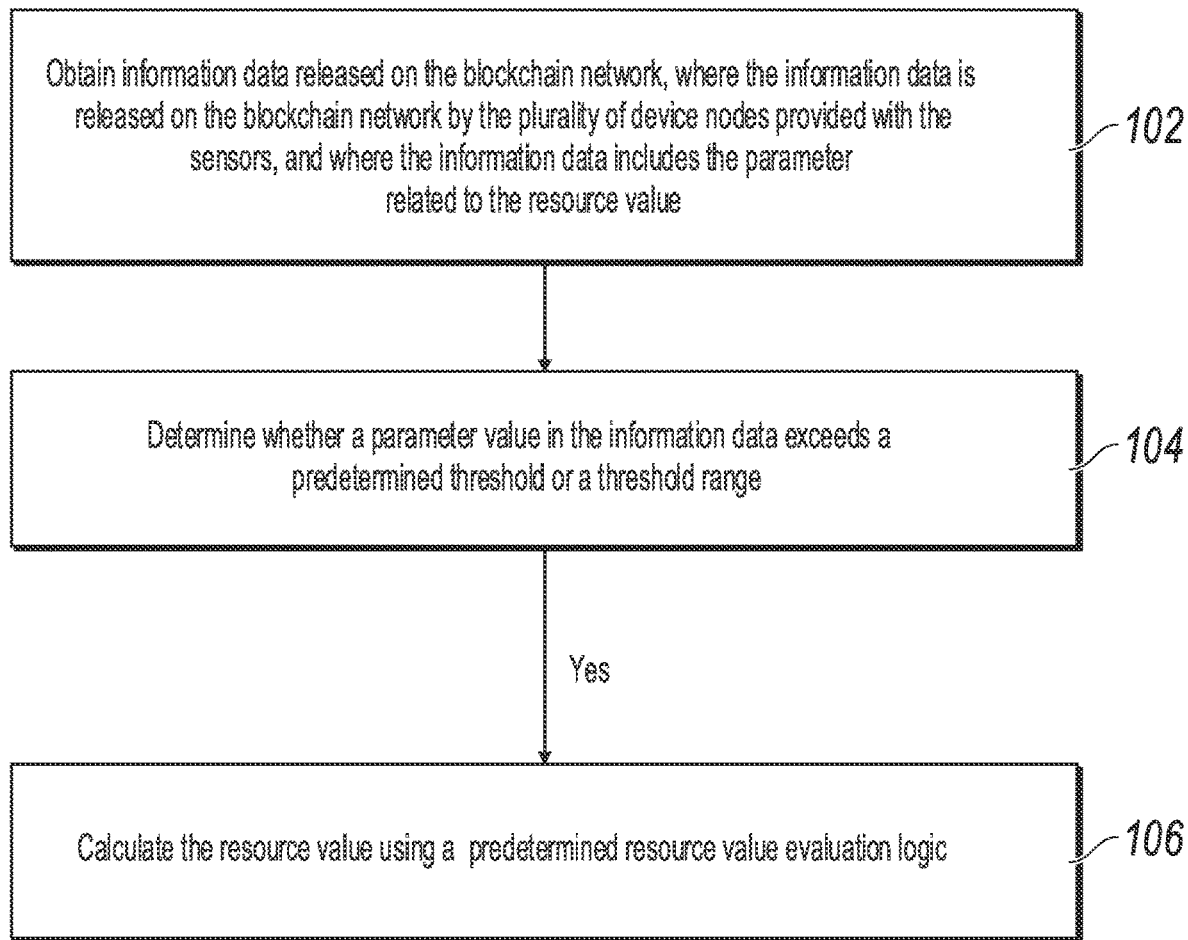
FIG. 1 is a flowchart illustrating a blockchain-based resource value evaluation method, according to an implementation of the present specification.

FIG. 1 is a flowchart illustrating a blockchain-based resource value evaluation method, according to an implementation of the present specification. A blockchain network includes a plurality of device nodes provided with sensors, and the sensors are configured to perceive or collect parameters related to a resource value. The method includes the following steps.

Step 102: Obtain information data released on the blockchain network, where the information data is released on the blockchain network by the plurality of device nodes provided with the sensors, and where the information data includes the parameter related to the resource value.

Step 104: Determine whether a parameter value in the information data exceeds a predetermined threshold or a threshold range.

In response to determining that the parameter value in the information data exceeds the predetermined threshold or the threshold range, the following step is performed.

Step 106: Calculate the resource value using a predetermined resource value evaluation logic.

The "resources", "movable property", or "goods" in the implementation of the present specification usually indicate mortgaged/pledged objects or supervised objects in a movable property or goods right financing process. The "movable property" is usually general merchandise that is easy to monetize and a relatively stable price in the production or circulation field. The "goods right" is an ownership of the described movable property in a form of a rights voucher such as a warehouse receipt and a bill of lading. Types of credit services of movable property or goods rights financing can include a short-term circulating fund loan, a banker's acceptance bill, commercial acceptance bill guarantee, international trade financing, etc., which are not limited in the present specification.

Although the price or the value of the movable property is relatively stable, there are many instances that the value of the movable property changes due to influence of a storage or supervisory environment in an actual movable property or goods rights financing process. The "device provided with a sensor" (which can be also referred to as a sensing device) in the implementation of the present specification is a device that is provided with the sensor and that can transmit or send information. The sensor can be configured to perceive or collect a parameter related to the value of the movable property, and the parameter can usually include weight of the movable property, temperature and humidity of a storage environment, conductivity of the movable property (when the movable property is an electronic component), storage time, etc. Regardless of foods or electronic products, the storage time is a key factor that affects the value of the movable property. The parameter perceived or transmitted by the sensor and related to the resource value in the present specification is not limited to a physical parameter. Other parameters related to the resource value such as an economic parameter, a provenance parameter, and a health index can be known by the sensor. For example, a unit price (usually affected by a market factor) of goods can be known by a sensor having a communication connection to a primary or secondary market of goods transaction. The provenance of the goods that affects the value of the goods can be known by reading a digital identity on a provenance certificate by the sensor. The health index of the goods can be known by using a health condition related to the goods transmitted to the sensor. After collecting the information perceived or collected by the sensor, the device provided with the sensor sends the information data to the blockchain network having a communication connection to a network of the device.

The "blockchain network" described in the implementation of the present specification can be a P2P network system that is obtained by nodes by using a consensus mechanism and that has a distributed data storage structure. Data in the blockchain network is distributed on "blocks (block)" that are connected to each other in terms of time. A latter block includes a data digest of a previous block. In addition, full data backup of all or some of the nodes is achieved based on different specific consensus mechanisms (for example, POW, POS, DPOS, and PBFT). A person skilled in the art is well aware that it is difficult for any node to tamper with data collected in a database of the blockchain network because a blockchain network system runs in a corresponding consensus mechanism. For example, for a blockchain network using POW consensus, an attack with at least 51% of a computing power (e.g., hash rate) of the entire network may be needed to tamper with existing data. Therefore, the blockchain network system is characterized by data security guarantee, anti-attack, and tamper-resistance that are incomparable to another centralized database system. It can be seen that in the implementation provided in the present specification, all the plurality of devices provided with the sensors can be added to the blockchain network by complying with the node service protocol for running the blockchain network, to serve as nodes of the blockchain network. The information data that is provided by the device provided with the sensor to the blockchain network and that is closely related to the value of the movable property is not attacked or tampered with by any other nodes in a blockchain network, thereby providing reliable guarantee for authenticity of calculating the value of the movable property.

In the implementation provided in the present specification, the resource value evaluation logic is usually set for the value of the movable property based on movable property value change trend experience or mathematical modeling, and a threshold or a threshold range is set for each parameter related to the value of the movable property. When it is perceived that each parameter value in the information data exceeds the predetermined threshold or the threshold range, the resource value is calculated based on the predetermined resource value evaluation logic. The value can be used to be compared with or record initial financing prices in movable property financing, to further monitor or evaluate the value change of the movable property.

In an implementation shown in the present specification, to reduce acknowledgment time of data on the chain, increase a transaction throughput, and satisfy security and performance needs, a consortium chain architecture can usually be selected to build the blockchain network. An institution with higher credit, for example, a large-scale commercial bank, a credit company, or a financial loan regulator such as China Banking Regulatory Commission, can serve as a member node of the consortium chain to participate in block ledger. A consensus process of the consortium chain is also controlled by the member node. When nodes more than a specified ratio (such as ⅔) on the network confirm one block, a transaction or data recorded in the block is confirmed throughout the network. The consortium chain can determine openness to the public based on an application scenario, and grant access to the consortium chain to an open institution. For example, in the present implementation, the large-scale commercial bank, the credit company, or the financial loan regulator such as China Banking Regulatory Commission, can serve as the member node to participate in block ledger, and each device provided with a sensor can be a common node that can access the consortium chain. In addition to the previous technical advantages such as a higher transaction throughput, building the blockchain network by using the consortium chain architecture can further build a unified value evaluation method and standard in movable property financing for members and common nodes in the same consortium chain.

The following uses a specific example to describe the resource value evaluation logic described in the previous implementation. For example, when the value of milk is used for movable property financing, the initial value of milk is usually first determined based on a price trend of milk in the market. Value evaluation logic of milk is concluded as follows based on a value analysis curve or mathematic model of milk: The value of milk starts to linearly decrease after 30% of the guarantee period; the value decreases to 5% after the expiration date; the value linearly decreases with time if the preference temperature is exceeded, and finally decreases to 5%; and the value of milk is directly zero if cows in the provenance are in poor health. Correspondingly, the value evaluation logic of milk can be expressed as follows:

```
. . .
if (provenance status<healthy_threshold)
{*price=0; return;}
```

-continued

```
else if (exp_date-date<30%*guarantee_period)
  {*price*=((exp_date-date)/(30%*guarantee_period))*(1-95%)}
  else   if   ((temperature>temp_upbound||
  temperature<temp_lowbound)  &&
days<day threshold1)
  {*price*=days*(1-95%)/day_threshold1}
  else if ((humidity>humidity_threshold && days<day_threshold2))
  {*price*=days*(1-95%)/day_threshold2}
  . . .
```

It can be seen from the value evaluation logic of milk that the parameters related to the value of milk can include provenance, date, temperature, humidity, etc. Based on a rule that the value of milk changes under influence of the parameters, a threshold or threshold range is further set for each parameter, for example, healthy_threshold, 30%*guarantee_period, [temp_lowbound, temp_upbound], day_threshold1, day_threshold2, and humidity_threshold in the described value evaluation logic. If it is perceived that a certain parameter value in the information data exceeds (is greater than or less than) the described threshold or threshold range, the current value of milk is calculated using a resource value evaluation logic. The calculated current value of milk can be recorded to monitor and evaluate movable property in real time, or to serve as an initial value for movable property value evaluation at a next stage. Or based on a degree that the calculated current value of milk is greater than or less than the initial value of milk at an initial stage of movable property financing, for example, an issued loan quota is correspondingly relaxed or tightened, or risk control over an issued loan is further relaxed or tightened.

Therefore, in another implementation shown in the present specification, the described value evaluation method of the movable property further includes: performing a processing service in response to a resource value change based on the calculated resource value. In other words, the processing service in response to the resource value change is performed based on a difference between the calculated resource value and the resource value estimated at the initial stage of movable property financing. For example, a financing amount generated based on the movable property is reevaluated, or further risk control processing is performed on a financing loan service started based on the movable property, and the risk control processing can include tightening or relaxing an unissued loan.

In the previous implementation provided in the present specification, the device provided with the sensor sends, to the blockchain network, the parameter related to the resource value and perceived or collected by the sensor, to ensure the authenticity and the validity of the parameter data by using a tamper-resistance mechanism of the blockchain network, thereby providing reliable guarantee for dynamic resource value evaluation. As a node in the blockchain network, a dynamic resource value evaluation institution dynamically evaluates the resource value based on the parameter obtained from the blockchain network; can perform a processing service in response to the resource value change, and adjust a financing policy in time, thereby avoiding a risky financing operation, and in particular, avoiding a risk to the loan institution caused when the movable property is obviously damaged in a pledging process or a storage process.

Further, in an implementation shown in the present specification, the determining whether a parameter value in the information data exceeds a predetermined threshold or a threshold range, and in respond to determining that the parameter value in the information data exceeds the predetermined threshold or the threshold range, calculating the resource value using a predetermined resource value evaluation logic can be performed by invoking a resource value evaluation smart contract released on the blockchain network. The resource value evaluation smart contract is invoked by using an instruction that is released on the blockchain network and that includes the information data. The smart contract declares a determination on whether the parameter value in the information data exceeds the predetermined threshold, and in response to determining that the parameter value in the information data exceeds the predetermined threshold, calculate the resource value using a resource value evaluation logic, to obtain the current resource value. Compared with a method that a resource value evaluation party such as a bank or a loan company calculates the resource value offline by using the information data on the blockchain network, and invokes a smart contract on the blockchain network to perform the described process, the smart contract can be invoked at request of a corresponding instruction at any time, thereby greatly improving operation efficiency. In addition, execution of the smart contract is characterized by less human intervention and authority decentralization. An operation result of the smart contract can be released after performing and achieving a consensus of the blockchain network, thereby increasing fairness and transparency of evaluation of the movable property. A deployment party of the previous smart contract can be an institution that needs to evaluate a movable property value change, such as a bank or a loan company, a resource value evaluation program that is deployed based on its own need, a movable property value evaluation institution in a consortium blockchain network that is recognized by the industry, a resource value evaluation program that is deployed based on needs of most loan companies, etc.

It is worthwhile to note that in the resource value evaluation method provided in the present specification, the threshold or threshold range predetermined for each parameter in the information data can be correspondingly adjusted based on a value change of the movable property, and the smart contract can be used to facilitate adjustment of the threshold or threshold range of the described parameter, and to make the previous adjustment fair and transparent.

Further, in still another implementation shown in the present specification, after the described resource value evaluation smart contract is executed and the current value of the movable property is obtained, a resource value change processing smart contract that runs on the blockchain network can be further invoked, and the smart contract performs a processing service in response to the resource value change, including: reevaluating a financing amount of the movable property, tightening or relaxing an unissued loan, etc. The present implementation is applicable, in particular, to a scenario that each bank or loan company node on the consortium blockchain network complies with a unified loan processing rule in the consortium, or a unified service processing rule after the value of the movable property changes. The described resource value evaluation smart contract and resource value change processing smart contract can be two associated programs of the same smart contract deployed at the same address of the blockchain network, or can be two smart contracts deployed on two different addresses of the same blockchain network, or can be two smart contracts respectively deployed on two different blockchain networks that have a communication connection, which is not limited in the present specification.

In still another implementation of the present specification, the device provided with the sensor is an Internet of Things sensor, that is, a sensing device exchanging information or performing communication through the Internet of Things, so as to implement information perception or collection of a plurality of functions, such as intelligent identification, positioning, tracking, monitoring, and management. Compared with a common device provided with a sensor that sends, to the blockchain network based on an operation instruction of a user, information data collected or obtained by the sensor, the IoT sensor can autonomously send, to the blockchain network based on a data sending rule or sending frequency that is set by the user, information data collected or obtained by the sensor. Therefore, advantages of IoT sensing and blockchain network technologies are combined when the IoT sensor perceives and collects the information data, and transmits the information data to the blockchain network. In the entire process of perceiving, collecting, transmitting, and saving the information, manual operations on the information data are reduced, thereby improving information transmission efficiency, and improving the objectiveness and the credibility of the transmitted information data. In addition, the described information data cannot be tampered with or imitated after being collected in the blockchain network, thereby ensuring data information reliability. Compared with the common device provided with a sensor, the IoT sensor has much lower power consumption, and environmental friendliness of the present implementation is also improved while energy consumption is reduced.

Based on different electromagnetic signal frequencies for building the Internet of Things, the described Internet of Things includes the Internet of Things built based on signals such as NB-IoT, WiFi, GPRS, Bluetooth, and LORA, which is not limited in the present specification.

In the described implementation of performing movable property evaluation on milk, an IoT sensor, for example, a weight sensor, an infrared temperature sensor, a humidity sensor, or a timer, that monitors parameters of milk such as weight, temperature, humidity, and storage duration first accesses the blockchain network through the Internet of Things configured in an area that milk is located in, to register as a node in the blockchain network. The described IoT sensor monitors, collects, and sends information data to the blockchain network based on frequency predetermined by a program of the sensor or based on another predetermined condition without a need of human intervention, thereby reducing human costs and preventing data distortion caused by manually operating or changing the information data. In addition, the information perceived or collected by the IoT sensor further needs to be encrypted and sent to the blockchain network and stored based on specific needs, thereby improving data information security. In addition, the described IoT sensor can sign an electronic signature on a mobile phone or perceived data, and send the electronic signature and the information data to the blockchain network, so as to prevent a malicious IoT sensor node from imitating a normal IoT sensor to send malicious information. Further, sending the information data to the blockchain network by the described IoT sensor can be the following: sending an instruction including the information data to the blockchain network, so as to invoke a resource evaluation smart contract on the blockchain network, determining, by using the smart contract, whether parameters such as weight, temperature, humidity, and storage duration in the information data exceed a predetermined threshold or threshold range, and autonomously executing resource value evaluation logic to obtain the current value of milk. In addition, a fuel operation mechanism of the smart contract is more helpful to prevent the IoT sensor infected with virus from being attacked by DDoS attacks, thereby improving the security of the entire system. Based on combination of the Internet of Things and the blockchain network technology, the described movable property value evaluation method including the entire process such as monitoring, sending, determining, and evaluation can be autonomously completed by the IoT sensor node by using the blockchain network, so that benefits such as lower labor costs, secure and credible information data, malicious tampering prevention, transparent and fair value determining and evaluation processes can be achieved, etc.

Figure 2:
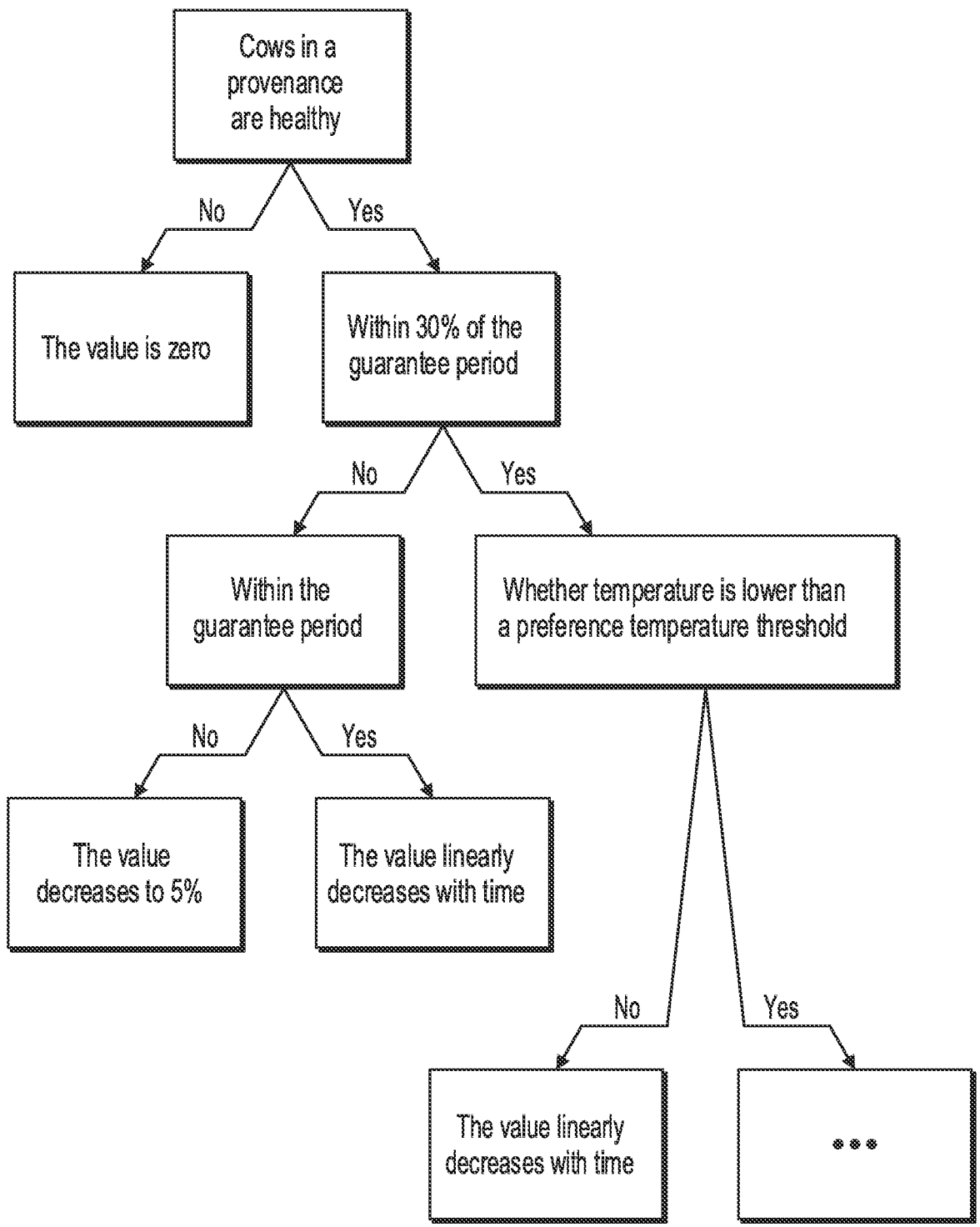
FIG. 2 is a schematic diagram illustrating a process of training a milk resource value evaluation model by using a decision tree method, according to an implementation of the present specification.

The resource value evaluation logic described in the present specification can be obtained by using historical pricing experience or a mathematical modeling process based on data such as historical value data/market value fluctuation. In another shown implementation, the previous resource value evaluation logic is obtained by performing machine learning training on the resource value based on the parameter related to the resource value. For example, a training set is formed based on historical data of the movable property value, an industry pricing standard, or other known data related to the movable property value, machine learning training is performed on the parameters related to the resource value (including but not limited to the goods nature, time, and an environment (for example, temperature, humidity, or noise)), and evaluation logic or an evaluation model is generated. A machine learning training method includes a decision tree method, a neural network method, etc. A decision tree generation algorithm can include ID3, C4.5, C5.0, etc. A decision tree is a tree structure. Each internal node represents determining of one attribute, each branch represents output of one determining result, and each leaf node represents one classification result. For example, the milk value evaluation logic discussed in the present specification can be trained by using the decision tree method. For milk value logic or model training, refer to FIG. 2. A detailed creating process is not described here. A person skilled in the art can know that when a resource value evaluation model is constructed by using an artificial intelligence method such as machine learning, more accurate and reasonable resource value evaluation logic can be obtained by performing input and output training on a large quantity of parameters.

In addition, it is worthwhile to note that the resource value evaluation model is closely related to a parameter setting method, and the described parameter setting method is further closely related to a method of obtaining a parameter (that is, a method of configuring the IoT sensor). To reduce the quantity of sensors and further economize data occupation space on the blockchain network, the movable property that can be aggregated together for value evaluation can be evaluated through overall evaluation. For example, for a plurality of boxes of milk in one container having the same production batch or production date, the value of all milk in the container can be calculated by collecting parameters such as weight, temperature, humidity, and storage time in the entire container, without a need to install a corresponding weight, temperature, humidity, or storage time sensor for each box of milk. For some movable property with aggregation of enhancement features, for example, a set of collections (such as antiques, artworks, or stamps), because a total price obtained by adding the value of each constituent entity one by one is far lower than the total evaluation value of the constituent entities being aggregated, a sensor needs to be configured for each constituent entity during evaluation of such movable property, to monitor corresponding parameters of each constituent entity, such as a location and an owner, and the previous information data is collected into the blockchain network. However, for some complex movable property forms, if the movable property includes the plurality of aggregation features, the value of resources of various aggregation features can be separately calculated, and then added together, to provide data reference for the loan quota.

Figure 3:
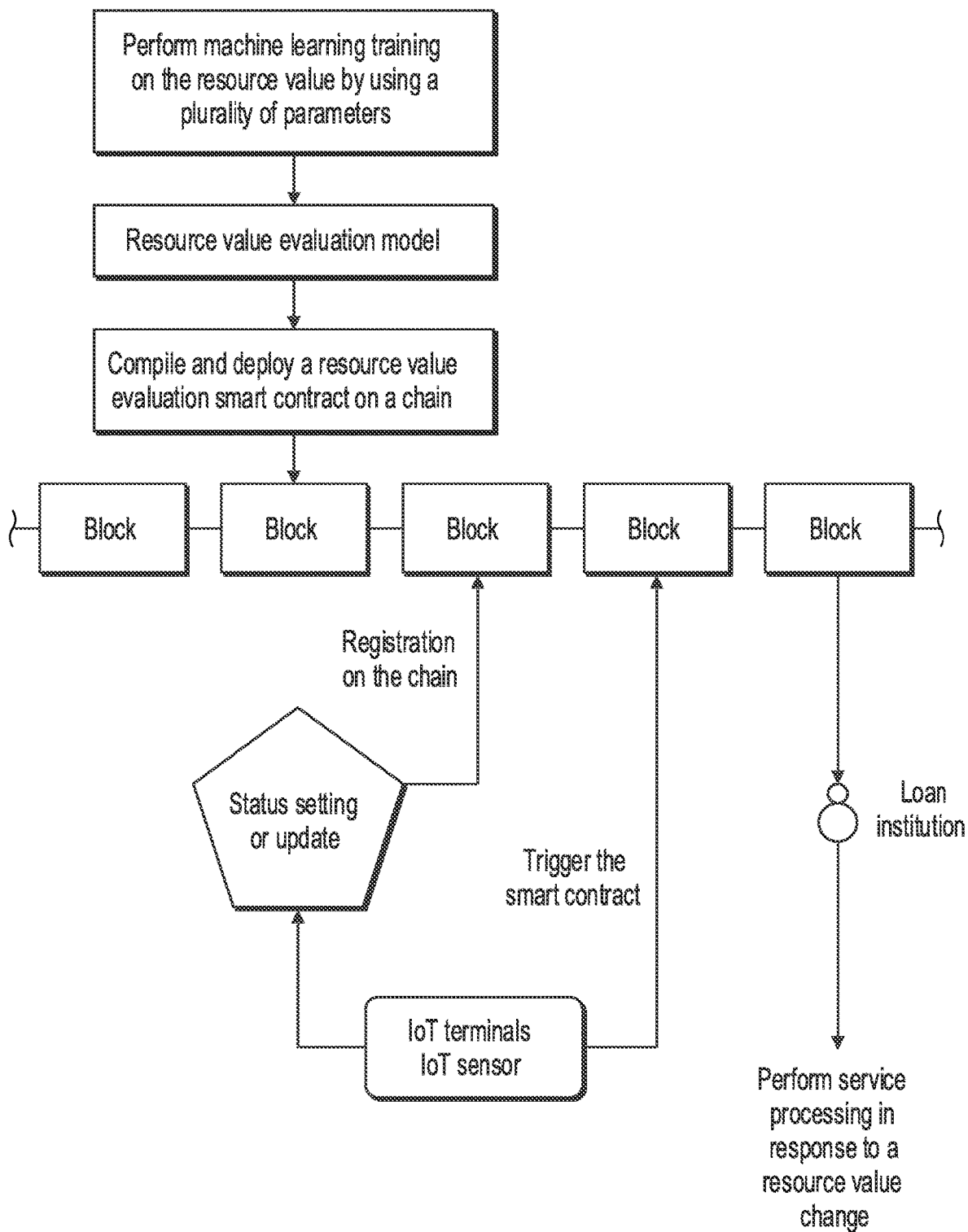
FIG. 3 is a schematic diagram illustrating a blockchain-based resource value evaluation method, according to an implementation of the present specification.

FIG. 3 is a schematic diagram illustrating a blockchain-based resource value evaluation and processing method, according to an implementation of the present specification. In the present implementation, machine learning training is performed on the value of movable property by using a plurality of parameters, to obtain a value evaluation model of the movable property. The value evaluation model of the movable property is written into a smart contract program, and is compiled and deployed on a blockchain network. In addition, through device status setting or updating, a plurality of IoT sensing devices (IoT Terminals) can run a node registration program of the blockchain network and obtain a corresponding account or address, to register with the blockchain network. There is no time sequence limitation between smart contract deployment and registration with the plurality of IoT sensing devices on the chain. Then, the plurality of IoT sensing devices perceive and collect information data from a working environment by using predetermined frequency, and release the information to the blockchain network in a form of a smart contract invoking instruction. A person skilled in the art should understand that the described instruction is used to trigger execution of the smart contract after verification (including verification based on electronic signatures of the IoT sensors) by the blockchain network, and an execution process includes determining whether a parameter value in the information data exceeds a predetermined threshold or a threshold range; and in respond to determining that the parameter value in the information data exceeds the predetermined threshold or the threshold range, calculating the current value of the movable property based on the value evaluation model of the movable property deployed in the smart contract or in another logical form. The smart contract can be invoked and executed on a plurality of nodes based on a specific consensus mechanism of the blockchain network, and a corresponding execution result is also verified and agreed on by using the plurality of nodes. A service executor such as a bank, a loan company, or a specialized movable property value evaluation company performs corresponding value change service processing based on a value change degree of movable property and a predetermined policy after receiving value change content. Optionally, processing logic in response to a movable property value change can be further deployed in the smart contract, and service processing performed in response to the movable property value change can continue to be performed by the smart contract. In addition, when different institutions such as loan companies or banks have different processing logic for a resource value change, the service processing performed in response to the movable property value change can be performed by another smart contract deployed on the blockchain network, or can be performed by a smart contract deployed on another blockchain network having a communication connection to the blockchain network, which is not limited in the present specification.

In the previous implementation, a plurality of technical solutions are combined, for example, resource value evaluation model training, resource value evaluation smart contract deployment on a chain, registering an IoT sensor with a chain, triggering, by the IoT sensor, the smart contact to execute resource value evaluation logic, and performing, by a loan institution, service processing in response to a resource value change. With reference to advantages of technologies of artificial intelligence training, an IoT sensing device, a blockchain network, and a smart contract, the movable property value can be monitored and processed or service processing in response to the value change can be performed at any time, thereby greatly reducing labor costs, and greatly reducing a degree that a resource value evaluation process is affected by an artificial subjective factor (for example, human modifying or tampering with a sensing information data parameter or subjectively and artificially establishing unreasonable value evaluation logic). Therefore, a fair, transparent, reasonable, and low-cost operation method is provided for movable property value evaluation and processing.

Figure 5:
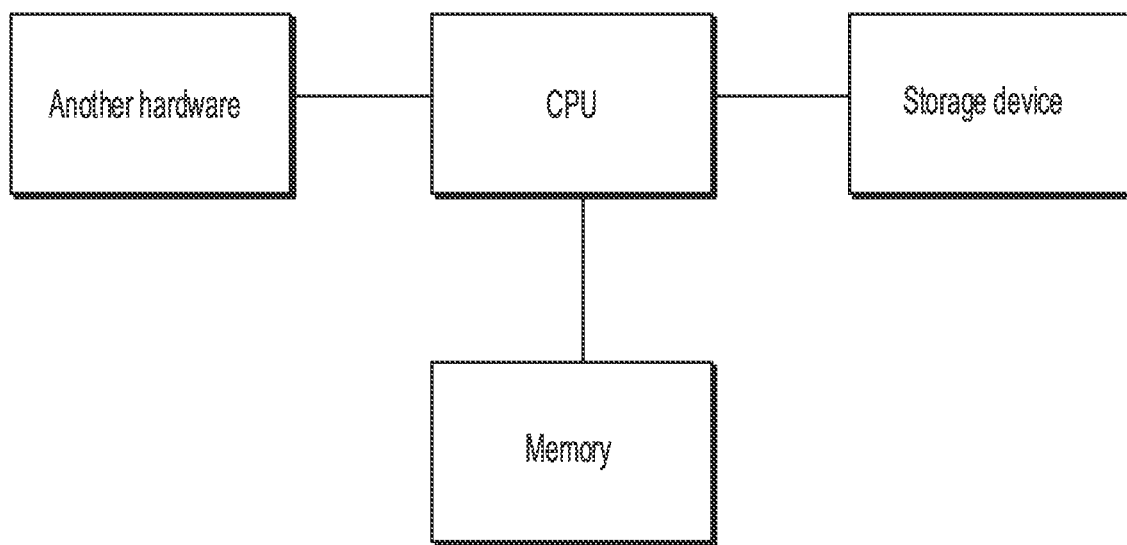
FIG. 5 is a diagram illustrating a hardware structure used to run a resource value evaluation apparatus implementation provided in the present specification.

Corresponding to the previous procedure implementation, an implementation of the present specification further provides a blockchain-based resource value evaluation and processing apparatus. The apparatus can be implemented by using software, or can be implemented by using hardware, or can be implemented by using a combination of hardware and software. Software implementation is used as an example. As a logic apparatus, the software is formed by reading a corresponding computer program instruction into a memory for running by using a central processing unit (CPU) in a device on which the software is located. In terms of hardware, in addition to the CPU, the memory, and the storage device shown in FIG. 5, the device on which the music originality analysis apparatus is located usually further includes other hardware such as a chip for sending and receiving radio signals, and/or other hardware such as a card for implementing a network communication function.

Figure 4:
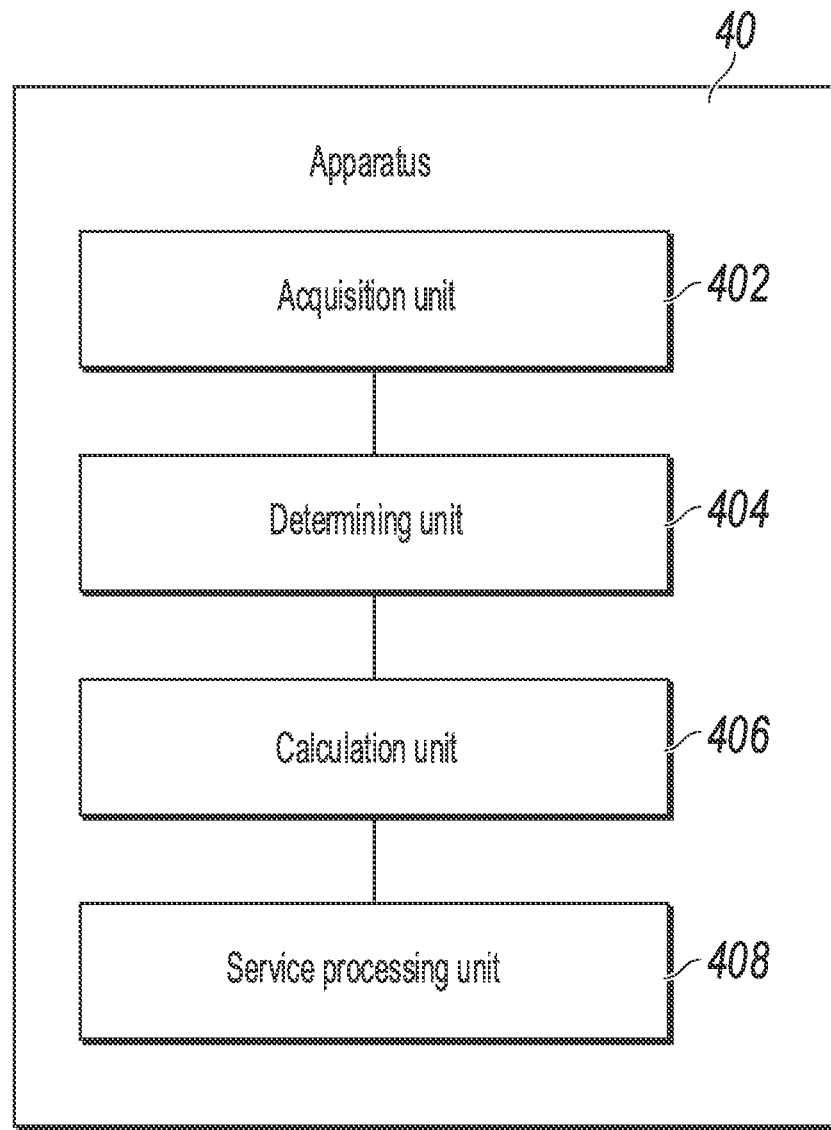
FIG. 4 is a schematic diagram illustrating a blockchain-based resource value evaluation apparatus, according to an implementation of the present specification.

FIG. 4 shows a blockchain-based resource value evaluation and processing apparatus 40 according to the present specification. A blockchain network includes a plurality of device nodes provided with sensors, and the sensors are configured to perceive or collect parameters related to a resource value. The apparatus 40 includes the following: an acquisition unit 402, configured to obtain information data released on the blockchain network, where the information data is released on the blockchain network by the plurality of device nodes provided with the sensors, and where the information data includes the parameter related to the resource value; a determining unit 404, configured to determine whether a parameter value in the information data exceeds a predetermined threshold or a threshold range; and a calculation unit 406, configured to calculate the resource value using a predetermined resource value evaluation logic.

Preferably, the blockchain-based resource value evaluation apparatus 40 can further include a service processing unit 408, configured to perform a processing service in response to a resource value change based on the calculated resource value.

For specific implementation processes of functions and roles of the units in the described apparatus, refer to the implementation processes of corresponding steps in the described method. For related parts, refer to descriptions in the method implementation. Details are omitted here for simplicity.

The described apparatus implementation is merely an example. The units described as separate parts can or cannot be physically separate, and parts displayed as units can or cannot be physical modules, can be located in one position, or can be distributed on a plurality of network modules. Some or all of the units can be selected based on actual needs to achieve the objectives of the solutions of the present specification. A person of ordinary skill in the art can understand and implement the implementations of the present invention without creative efforts.

The apparatus or unit described in the described implementations can be implemented by a computer chip or an entity, or implemented by a product with a function. A typical implementation device is a computer. The computer can be a personal computer, a laptop computer, a cellular phone, a camera phone, a smartphone, a personal digital assistant, a media player, a navigation device, an email device, a game console, a tablet computer, or a wearable device, or a combination of any of these devices.

Corresponding to the described method implementation, an implementation of the present specification further provides a computer device, and the computer device includes a memory and a processor. The memory stores a computer program that can be run by the processor. When running the stored computer program, the processor performs steps of the blockchain-based resource value evaluation method in the present implementation of the present specification. For detailed descriptions of the steps of the blockchain-based resource value evaluation and processing implementation method, refer to previous content, and no repetition is needed.

Corresponding to the described method implementation, an implementation of the present specification further provides a computer readable storage medium, and the storage medium stores a computer program. When the computer program is run by a processor, steps of the blockchain-based resource value evaluation method in the present implementation of the present specification are performed. For detailed descriptions of the steps of the method for implementing blockchain-based music originality analysis, refer to the previous content, and no repetition is needed.

The previous descriptions are merely example implementations of the present specification, but are not intended to limit the present specification. Any modification, equivalent replacement, or improvement made without departing from the spirit and principle of the present specification should fall within the protection scope of the present specification.

In a typical configuration, the computing device includes one or more processors (CPU), one or more input/output interfaces, one or more network interfaces, and one or more memories.

The memory can include a form of a volatile memory, a random access memory (RAM) and/or a nonvolatile memory, etc. in a computer readable medium, such as a read-only memory (ROM) or a flash memory (flash RAM). The memory is an example of the computer readable medium.

The computer readable medium includes volatile and nonvolatile, removable and non-removable media, and can store information by using any method or technology. The information can be a computer readable instruction, a data structure, a program module, or other data.

A computer storage medium includes but is not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by the computing device. Based on the definition in the present specification, the computer readable medium does not include a transitory computer readable medium (transitory media), for example, a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present specification can be provided as a method, a system, or a computer program product. Therefore, the implementations of the present specification can use a form of hardware only implementations, software only implementations, or implementations with a combination of software and hardware. In addition, the implementations of the present specification can use a form of a computer program product that is implemented on one or more computer-usable storage media (including but not limited to a disk memory, a CD-ROM, an optical memory, etc.) that include computer-usable program code.

Figure 6:
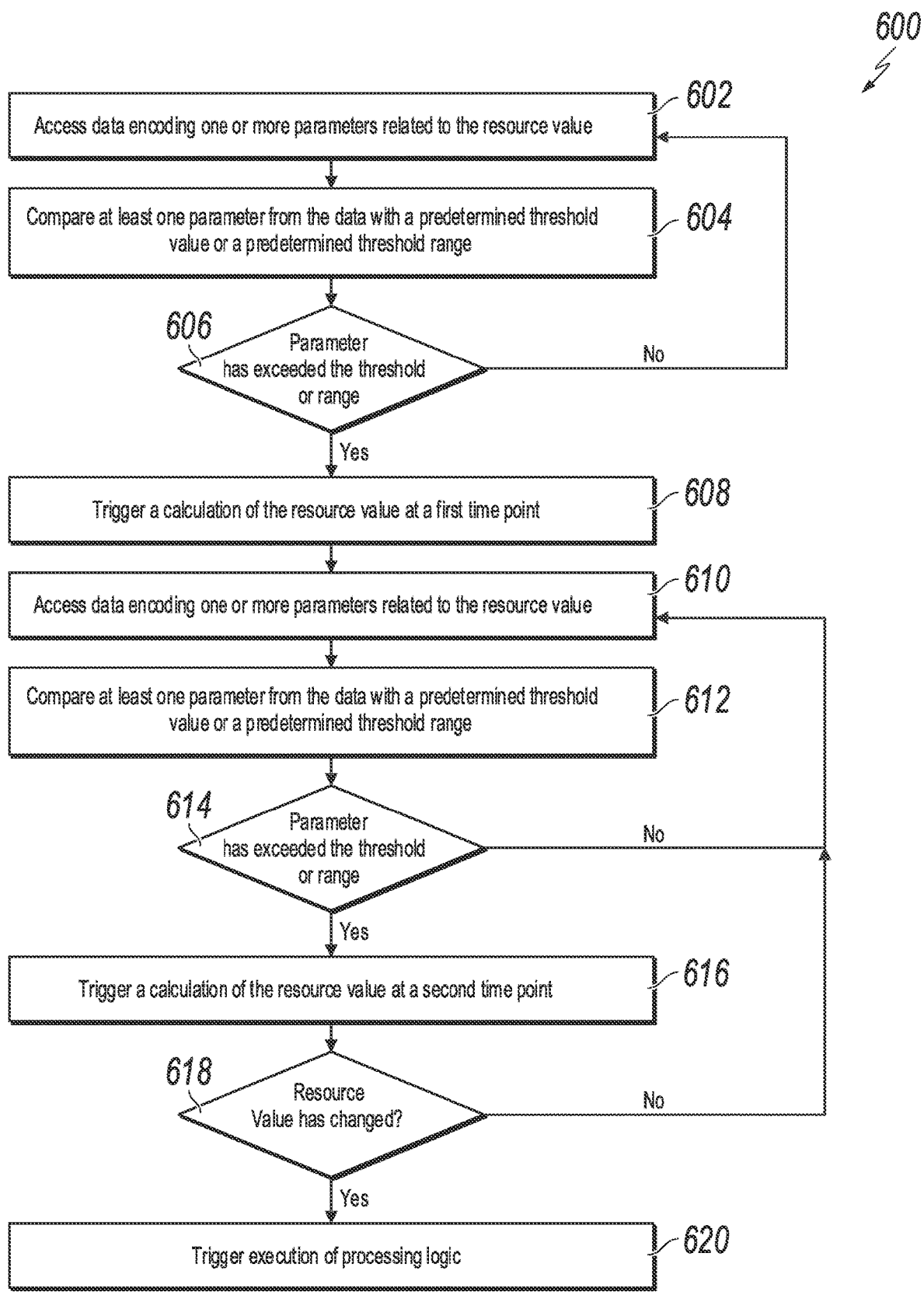
FIG. 6 is a flowchart illustrating an example of a computer-implemented method for dynamically evaluating a resource value, according to an implementation of the present disclosure.

In the above context, FIG. 6 is a flowchart illustrating an example of a computer-implemented method 600 for dynamically evaluating a resource value in an autonomous and transparent manner, according to an implementation of the present specification. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, method 600 accesses data encoding one or more parameters related to a resource value. As described above in association with FIGS. 1 to 3, examples of the parameters include physical factors such as environment temperature and humidity, and duration of time related to product performance. The one or more parameters are monitored by sensors that form an Internet of Things (IoT). In some cases, the IoT of sensors may form an autonomous ring of devices that poll the environment to sense the one or more parameters regularly and communicate to each other through a local connection protocol. In some cases, the IoT of sensors may collect, record, and report a reading when the parameter experienced a statistically significant change, for example, more than one standard deviation of noise. The information are then released by the IoT of the sensors on a blockchain network. Some embodiments provide gateways for the IoT of sensors to interact with the blockchain network. An example of a gateway provides registration and authentication services for the IoT of sensors to report regularly or to broadcast (when triggered by an event over the IoT) information being monitored such that consensus nodes maintain update-to-date information about the parameters being monitored. From 602, method 600 proceeds to 604.

At 604, at least one parameter being monitored is compared with a predetermined threshold value or a predetermined threshold range. As described above in association with FIGS. 1 to 3, some embodiments may compare, in the specific example of tracking milk stock supply, various parameters such as provenance status, storage temperature, and current date, against a threshold value or a threshold range. From 604, method 600 proceeds to 606.

At 606, a determination is made as to whether the parameter being compared has exceeded the predetermined threshold value or the predetermined threshold range. As described above in association with FIGS. 1 to 3, the information data exceeds the threshold when the parameter being monitored becomes greater than or less than the described threshold, or when the parameter being monitored falls outside the described threshold range. At 608, in response to the parameter being monitored exceeding the threshold value or the threshold range, a calculation is triggered to calculate the resource value according to an evaluation logic. When the determination reveals that the parameter being monitored has not exceeded the predetermined threshold value (or the predetermined threshold range), method 600 can proceed from 606 to 602. As described above in association with FIGS. 1 to 3, the evaluation logic is described by a smart contract on the blockchain network in association with the one or more parameters. From 608, method 600 proceeds to 610.

At 610, method 600 accesses data encoding one or more parameters related to the resource value and then proceeds to 612 and 614, where a comparison between the parameter being monitored and the predetermined threshold value (or the predetermined threshold range) and then a determination is made as to whether the parameter exceeds the predetermined threshold value (or the predetermined threshold range). In response to the parameter being monitored exceeding the threshold value or the threshold range, the method proceeds to 612 where a calculation is triggered to calculate the resource value according to the evaluation logic described in the smart contract. In response to determining that the parameter being monitored has not exceeded the predetermined threshold value (or the predetermined threshold range), method 600 can proceed to 610, as already described above.

From 616, method 600 proceeds to 618 where a determination is made as to whether the resource value as calculated has changed. As described above in association with FIGS. 1 to 3, the change in the resource value can manifest as a difference between the resource values at a first time point (an initial time point) and then at a second time point (a later time point). The change can indicate an alteration from an earlier value estimated at, for example, an initial stage of moveable property financing. This change can alter the amount of financing generated based on the moveable property. The change can also warrant renewed risk control processing for financing a loan service already started based on the moveable property. The risk control processing can include tightening or relaxing terms for an unissued loan. For example, collaterals can be lowered or heightened based on the changed resource value.

In response to the resource value being changed, method 600 proceeds to 618 where execution of processing logic is triggered. For example, a processing service can be performed in response to the resource value change to adjust a financing policy in time, thereby avoiding the uncertainties associated with an otherwise innocuous financing operation undertaken by a loan institution. In response to the resource value remain unchanged, method 600 can proceed to 610, as already described above.

By combining an IoT of sensors and a blockchain network, implementations described in this specification can track, for example, one or more parameters characterizing physical attributes of a moveable property via the IoT of sensors, and in response to a parameter being tracked exceeding a threshold value/range, calculate a new resource value predicated on the updated physical attributes according to an evaluation logic described be a smart contract that has been released on the blockchain network. From an initial time point to a later time point, the resource value can be evaluated timely based on changing parameters as sensed by the IoT of sensors, verified by a gateway to the blockchain network, and reported on the blockchain network. When the resource value has changed between the recording time points, a processing service can be performed to reassess a term of a loan that is related to the resource value. By virtue of invoking consensus nodes on a blockchain network, an autonomous mechanism can be invoked to initiate timely evaluation of the resource value and likely adjustment of a term of a loan predicated on the resource value. This autonomous mechanism is without a centralized authority. In embodiments disclosed in this specification, the evaluation of the resource value operates on consensus reached among participant nodes on the blockchain network, which can be a consortium network. The blockchain network can release and publish smart contracts encoding the evaluation logic to be executed in response to a parameter of the physical attributes exceeding a threshold value/range. The smart contracts can also encode the processing logic to be executed in response to changes in the resource value, for example, from an initial estimate. In embodiments disclosed in this specification, machine learning training is performed to refine the evaluation logic based on, at least in part, historical data indicating fluctuations of the resource value, and an industry pricing standard related to the resource value such that when the at least one parameter value has subsequently exceeded the predetermined threshold value/range, the resource value is calculated according to the evaluation logic that has been refined. The machine learning training can incorporate a decision tree method that traverses leaf nodes from more than one branches to search for a path to arrive at an improved attribute.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed

What is claimed is:
1. A computer-implemented method for dynamically updating a resource value in a blockchain network, the method comprising:
    receiving, by one or more processors of a plurality of device nodes on a consortium blockchain network, historical data indicating fluctuations of a resource value, and an industry pricing standard related to the resource value;

providing, by the one or more processors, the historical data as input to a machine learning algorithm;

processing, by the one or more processors using the machine learning algorithm, the fluctuations of the resource value and the industry pricing standard related to the resource value, as a perishable good, by executing a decision tree method to search a tree structure that identifies one or more leaf nodes, each leaf node of the one or more leaf nodes representing a classification result of a respective parameter related to a respective attribute of one or more attributes of the resource value;

processing, by the one or more processors using the machine learning algorithm, the classification result of the respective parameter related to the respective attribute;

determining, by the one or more processors using the machine learning algorithm, a projected change of the resource value, as the perishable good, within a time period during which one or more parameters related to the one or more attributes of the resource value change relative to environmental factors according to at least one rule;

determining, by the one or more processors using the machine learning algorithm, an updated attribute of the resource value based on the projected change of the resource value within the time period;

generating, by the one or more processors using the machine learning algorithm, evaluation logic associated with the one or more parameters based on the updated attribute;

compiling, by the one or more processors, a resource value evaluation smart contract comprising the evaluation logic;

forming, by the one or more processors, an autonomous ring of devices by connecting a plurality of sensors implemented on the plurality of device nodes to each other through a local connection protocol;

polling, by the one or more processors using the plurality of sensors, an environment to detect the environmental factors;

receiving, by one or more processors of the consortium blockchain network from the plurality of sensors based on the polling, the one or more parameters related to the one or more attributes of the resource value;

executing, by the one or more processors of the consortium blockchain network, the resource value evaluation smart contract; wherein executing the resource value evaluation smart contract comprises:
  determining, by the one or more processors of the consortium blockchain network using the evaluation logic, that a first parameter of the one or more parameters is outside a threshold range;
  in response to determining that the first parameter is outside the threshold range, invoking, by the one or more processors of the consortium blockchain network, a resource value change smart contract;

updating, by the one or more processors of the consortium blockchain network using the resource value change smart contract, the resource value, as an updated resource value;

performing, by the one or more processors of the consortium blockchain network, a service processing based on the updated resource value, wherein performing the service processing comprises transferring a digital asset within the consortium blockchain network in response to a resource value transfer.

2. The computer-implemented method of claim 1, comprising reaching a consensus, on the consortium blockchain network regarding the resource value that has been calculated, wherein:
  the consensus is reached on the consortium blockchain network at a first time point by virtue of a calculation of the resource value being triggered at the first time point;
  the consensus is reached on the consortium blockchain network at a second time point that is subsequent to the first time point and by virtue of the calculation of the resource value being triggered at the second time point; and
  the consensus regarding the resource value is changed when the consensus on the consortium blockchain network at the first time point is different from the consensus on the consortium blockchain network at the second time point.

3. The computer-implemented method of claim 1, wherein the tree structure comprises:
  one or more internal nodes, each of the one or more internal nodes representing a process for determining a respective parameter of the one or more parameters related to a respective attribute of the resource value;
  one or more branches, each of the one or more branches representing an output of a determination result of the respective parameter related to the respective attribute; and
  and
  wherein each branch of the one or more branches connects at least one internal node of the one or more internal nodes to at least one leaf node of the one or more leaf nodes.

4. The computer-implemented method of claim 1, wherein the evaluation logic comprises a percentage variation of the resource value.

5. A non-transitory, computer-readable medium storing one or more instructions that, when executed by a processor of a first device node of a plurality of device nodes of a consortium blockchain network, cause the processor to perform operations for updating a resource value in the consortium blockchain network, wherein the plurality of device nodes comprises a plurality of sensors, and the first device node comprises a first sensor of the plurality of sensors, the operations comprising:
  receiving historical data indicating fluctuations of the resource value, and an industry pricing standard related to the resource value;
  providing the historical data as input to a machine learning algorithm;
  processing, using the machine learning algorithm, the fluctuations of the resource value and the industry pricing standard related to the resource value, as a perishable good, by executing a decision tree method to search a tree structure that identifies one or more leaf nodes, each leaf node of the one or more leaf nodes representing a classification result of a respective parameter related to a respective attribute of one or more attributes of the resource value;
  processing, using the machine learning algorithm, the classification result of the respective parameter related to the respective attribute;
  determining, using the machine learning algorithm, a projected change of the resource value, as the perishable good, within a time period during which one or more parameters related to the one or more attributes of the resource value change relative to environmental factors according to at least one rule;

determining, using the machine learning algorithm, an updated attribute of the resource value based on the projected change of the resource value within the time period;

generating, using the machine learning algorithm, evaluation logic associated with the one or more parameters based on the updated attribute;

compiling a resource value evaluation smart contract comprising the evaluation logic;

forming an autonomous ring of devices by connecting the first sensor to the plurality of sensors on the plurality of device nodes through a local connection protocol;

polling, using the plurality of sensors, an environment to detect the environmental factors;

receiving, from a plurality of sensors based on the polling, the one or more parameters related to the one or more attributes of the resource value;

executing the resource value evaluation smart contract; wherein executing the resource value evaluation smart contract comprises:
  determining, using the evaluation logic, that a first parameter of the one or more parameters is outside a threshold range;
  in response to determining that the first parameter is outside the threshold range, invoking a resource value change smart contract;
  updating, using the resource value change smart contract, the resource value, as an updated resource value;
and performing a service processing based on the updated resource value, wherein performing the service processing comprises transferring a digital asset within the consortium blockchain network in response to a resource value transfer.

6. The non-transitory, computer-readable medium of claim 5, the operations comprising reaching a consensus, on the consortium blockchain network regarding the resource value that has been calculated, wherein:
  the consensus is reached on the consortium blockchain network at a first time point by virtue of a calculation of the resource value being triggered at the first time point;
  the consensus is reached on the consortium blockchain network at a second time point that is subsequent to the first time point and by virtue of the calculation of the resource value being triggered at the second time point; and
  the consensus regarding the resource value is changed when the consensus on the consortium blockchain network at the first time point is different from the consensus on the consortium blockchain network at the second time point.

7. The non-transitory, computer-readable medium of claim 5, wherein the tree structure comprises:
  one or more internal nodes, each of the one or more internal nodes representing a process for determining a respective parameter of the one or more parameters related to a respective attribute of the resource value;
  one or more branches, each of the one or more branches representing an output of a determination result of the respective parameter related to the respective attribute; and wherein each branch of the one or more branches connects at least one internal node of the one or more internal nodes to at least one leaf node of the one or more leaf nodes.

8. The non-transitory, computer-readable medium of claim 5, wherein the operations further:
  releasing, on the consortium blockchain network, the resource value evaluation smart.

9. A computer-implemented system, comprising:
  a first device node of a plurality of device nodes of a consortium blockchain network, the first device node comprising:
    a first sensor;
    one or more processors; and
    one or more computer memory devices interoperably coupled with the one or more processors and having tangible, non-transitory, machine-readable media storing one or more instructions that, when executed by the one or more processors, perform one or more operations for updating a resource value in the consortium blockchain network, the operations comprising:
      receiving historical data indicating fluctuations of the resource value, and an industry pricing standard related to the resource value;
      providing the historical data as input to a machine learning algorithm;
      processing, using the machine learning algorithm, the fluctuations of the resource value and the industry pricing standard related to the resource value, as a perishable good, by executing a decision tree method to search a tree structure that identifies one or more leaf nodes, each leaf node of the one or more leaf nodes representing a classification result of a respective parameter related to a respective attribute of one or more attributes of the resource value;
      processing, using the machine learning algorithm, the classification result of the respective parameter related to the respective attribute;
      determining, using the machine learning algorithm, a projected change of the resource value, as the perishable good, within a time period during which one or more parameters related to the one or more attributes of the resource value change relative to environmental factors according to at least one rule;
      determining, using the machine learning algorithm, an updated attribute of the resource value based on the projected change of the resource value within the time period;
      generating, using the machine learning algorithm, evaluation logic associated with the one or more parameters based on the updated attribute;
      compiling a resource value evaluation smart contract comprising the evaluation logic;
      forming an autonomous ring of devices by connecting the first sensor to a plurality of sensors on the plurality of device nodes through a local connection protocol;
      polling, using the plurality of sensors, an environment to detect the environmental factors;
      receiving, from a plurality of sensors based on the polling, the one or more parameters related to the one or more attributes of the resource value;

executing the resource value evaluation smart contract;
wherein executing the resource value evaluation smart contract comprises:
determining, using the evaluation logic, that a first parameter of the one or more parameters is outside a threshold range;
in response to determining that the first parameter is outside the threshold range, invoking a resource value change smart contract;
updating, using the resource value change smart contract, the resource value, as an updated resource value;
and
performing a service processing based on the updated resource value, wherein performing the service processing comprises transferring a digital asset within the consortium blockchain network in response to a resource value transfer.

10. The computer-implemented system of claim 9, the operations comprising reaching a consensus, on the consortium blockchain network regarding the resource value that has been calculated, wherein:
the consensus is reached on the consortium blockchain network at a first time point by virtue of a calculation of the resource value being triggered at the first time point;
the consensus is reached on the consortium blockchain network at a second time point that is subsequent to the first time point and by virtue of the calculation of the resource value being triggered at the second time point; and
the consensus regarding the resource value is changed when the consensus on the consortium blockchain network at the first time point is different from the consensus on the consortium blockchain network at the second time point.

11. The computer-implemented system of claim 9, wherein the tree structure comprises:
one or more internal nodes, each of the one or more internal nodes representing a process for determining a respective parameter of the one or more parameters related to a respective attribute of the resource value;
one or more branches, each of the one or more branches representing an output of a determination result of the respective parameter related to the respective attribute; and
wherein each branch of the one or more branches connects at least one internal node of the one or more internal nodes to at least one leaf node of the one or more leaf nodes.

12. The computer-implemented system of claim 9, wherein the operations comprise:
releasing, on the consortium blockchain network, the resource value evaluation smart contract.

* * * * *

UNITED STATES PATENT AND TRADEMARK OFFICE
CERTIFICATE OF CORRECTION

PATENT NO. : 11,250,481 B2
APPLICATION NO. : 16/780221
DATED : February 15, 2022
INVENTOR(S) : Xinying Yang It is certified that error appears in the above-identified patent and that said Letters Patent is hereby corrected as shown below:

In the Claims

Column 19, Line 63, in Claim 1, after "value;" insert -- and --.

Column 20, Line 31, in Claim 3, below "and" delete "and".

Column 22, Line 8, in Claim 8, after "evaluation smart" insert -- contract --.

Signed and Sealed this
Seventeenth Day of May, 2022

Katherine Kelly Vidal
*Director of the United States Patent and Trademark Office*